July 11, 1944. J. VANCOPPENOLLE 2,353,603
DEVICE FOR THE SUSPENSION OF VEHICLES
Filed July 19, 1939 3 Sheets-Sheet 1
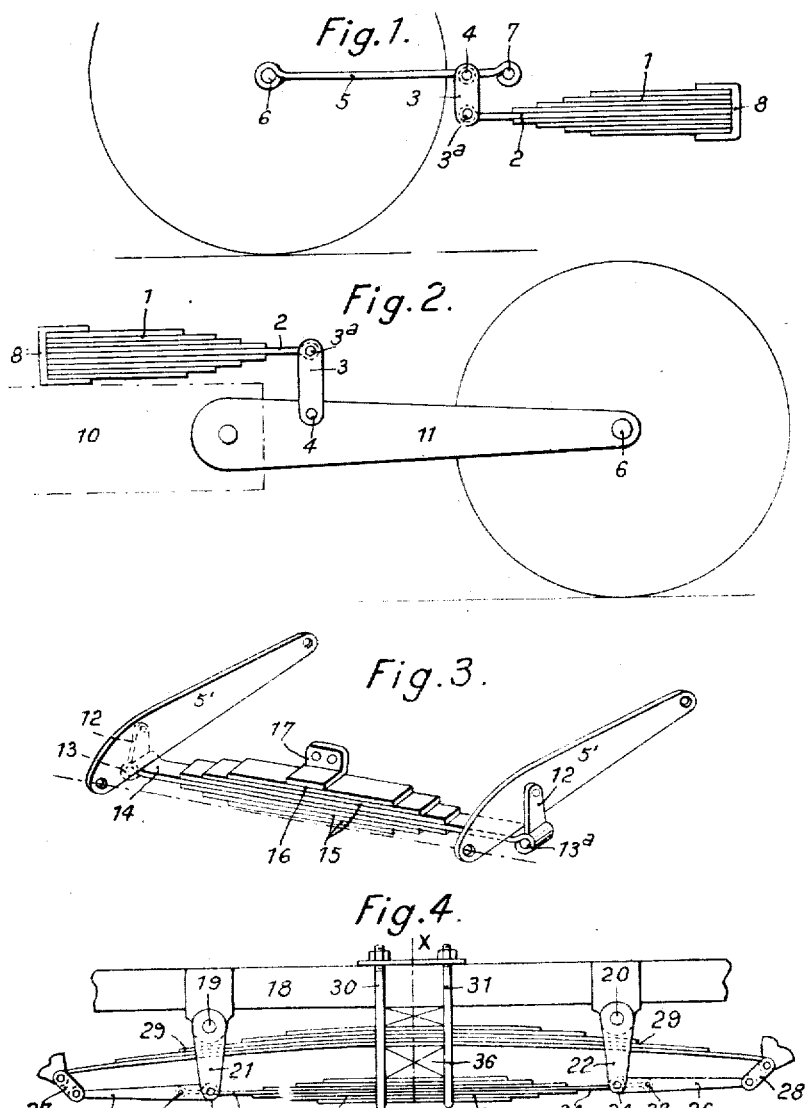
INVENTOR
JEAN VANCOPPENOLLE
BY Haseltine Lake & Co.
ATTORNEYS

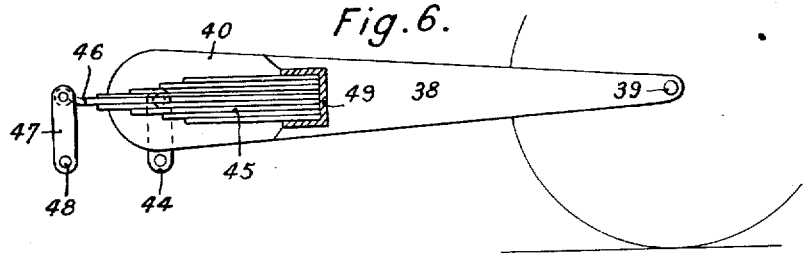
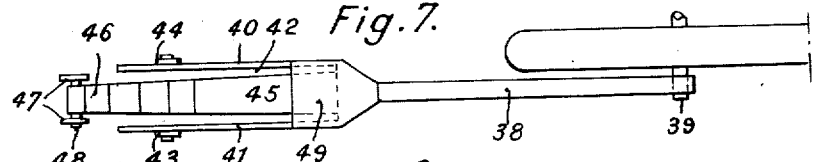
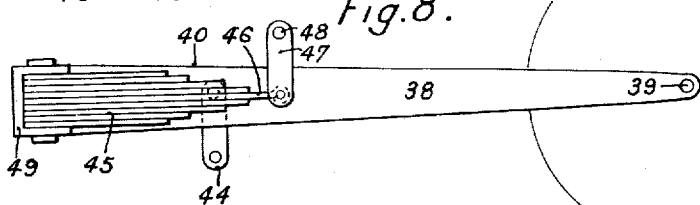
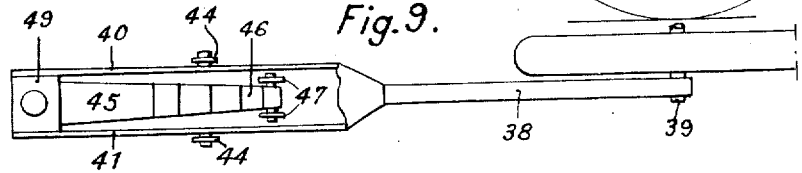
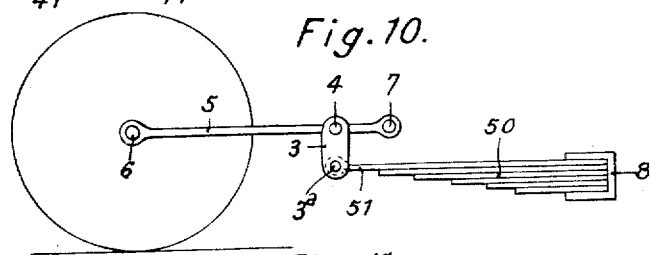
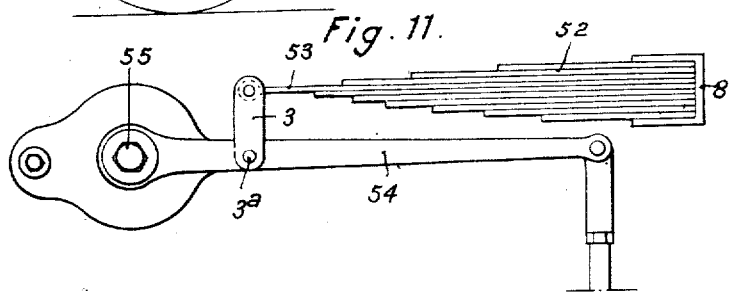

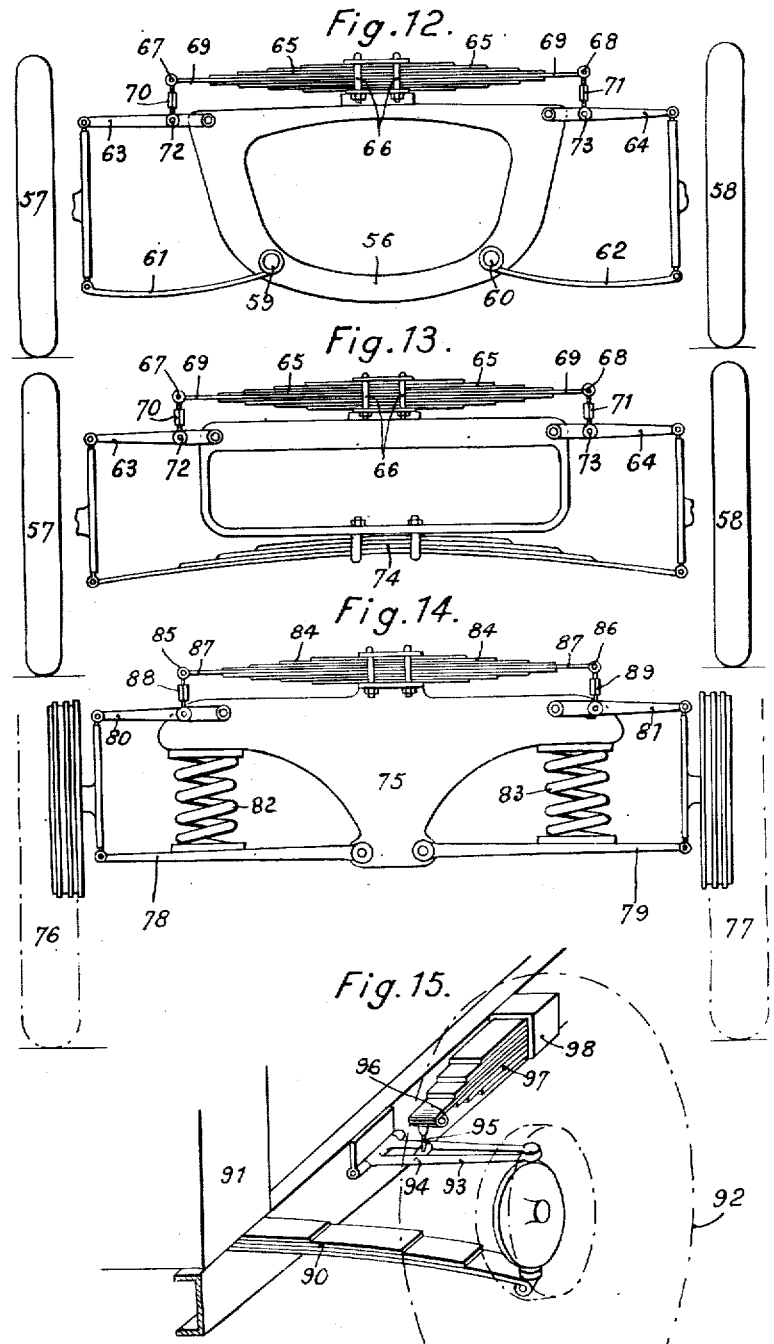

Patented July 11, 1944

2,353,603

UNITED STATES PATENT OFFICE 2,353,603

DEVICE FOR THE SUSPENSION OF VEHICLES

Jean Vancoppenolle, Caen, Calvados, France; vested in the Alien Property Custodian Application July 19, 1939, Serial No. 285,256
In France August 5, 1938

4 Claims. (Cl. 267—19)

The invention relates to the system of suspension for vehicles, in particular for automobile vehicles, according to which, to the usual suspension which comprises a resilient device and a braking device, is added an auxiliary suspension which introduces an additional resilient resistance effect that is greater as the main suspension is farther away from its position of equilibrium.

The invention has for its object a device for such an auxiliary suspension, which is characterized by a multiple leaf spring, the deformations of which are reduced relatively to those of the main suspension.

Under these conditions, the auxiliary suspension may be obtained by means of a single multiple leaf spring or of a single set of multiple leaf springs.

In a number of cases, a spring is used wherein the leaves are arranged equally on either side of the main leaf or a set of such springs is used; the auxiliary suspension acts in this case in the same manner for the deformations of the main suspension in both directions from the position of equilibrium.

In other cases, the leaves are less in number, or even completely eliminated, on one of the sides of the main leaf, so that the auxiliary suspension acts with a force which is variable according to the direction of the deformation of the suspension from its position of equilibrium.

A particularly simple manner of obtaining the reduction of the deformations of the auxiliary suspension consists in attaching same at a point of a lever interposed between the suspended part and the unsuspended part of the vehicle.

Hereinafter, some embodiments of a device according to the invention will be described by way of examples. Reference will be had to the accompanying diagrammatical drawings in which:

Fig. 1 is a side view of a first main form of the invention;

Fig. 2 is a side view of a modification;

Fig. 3 is a perspective view of another modification of the form according to Fig. 1;

Fig. 4 is a front view of a second main form or modification;

Fig. 5 is a similar modification;

Fig. 6 is a side view of another modification;

Fig. 7 is a corresponding plan view of said modification;

Fig. 8 is a side view of a further modification based on the modification according to Figs. 6 and 7;

Fig. 9 is a corresponding plan view of the modification of Fig. 8;

Fig. 10 is a modification of the invention as shown in Fig. 1;

Fig. 11 is another modification of the invention;

Fig. 12 is a diagrammatical front view of another main form or modification;

Fig. 13 is a similar modification;

Fig. 14 is a front view of a further modification;

Fig. 15 is a perspective view of still another modification.

Referring to Fig. 1, the auxiliary suspension according to the invention comprises a multiple leaf spring 1, the leaves of which are arranged on both sides of a main leaf 2 which is attached, at one of its ends, to the end 3ª of a shackle 3. Said shackle is pivoted, by its other end 4, at an intermediate point of a lever 5 interposed between a point 6 of the unsuspended part of the vehicle and a point 7 of the suspended part. The ends of the leaves of the spring 1, which are opposite to the end of the main leaf 2 attached to the shackle 3, are rigidly secured to the suspended part of the vehicle, for example by means of a half-collar 8.

For a vehicle, one or a plurality of leaf springs 1 may be provided, arranged as just described. This auxiliary suspension adds its effects to those of the main suspension of the vehicle, which main suspension is retained.

When there is a deformation of the main suspension, producing a relative movement between the unsuspended part and the suspended part of the vehicle, the ends of the leaves of the spring 1 which are clamped by the half-collar 8 participate in the movement of the suspended part, whereas the end of the main leaf 2 attached to the shackle 3 undergoes substantially the movement of the intermediate point 4 of the lever 5. If the movements are referred to the suspended part of the vehicle considered as a reference system, it will be seen that the deformations of the main suspension are materialized by the movement of the point 6 about the axis of rotation 7 which is in this case fixed, whereas the deformation of the auxiliary suspension is materialized by the movement of the point 4, the amplitude of which is reduced relatively to the movement of the point 6 in the ratio of the distances of the points 4 and 6 from the axis 7.

The small amplitude of the movements of the point of attachment 3ª of the main leaf 2 enables a spring to be used in which the leaves are arranged on both sides of the main leaf, without untimely breaks occurring.

On the other hand, the auxiliary suspension acts simultaneously whatever be the direction and the amplitude of the deformation of the main suspension.

Fig. 2 shows a modification in the case in which the suspended part 10 of the vehicle is connected to the unsuspended part, which is represented by the point 6, by means of an arm 11. In this case, said arm advantageously performs the function of the lever 5, thereby reducing to a minimum the number of members to be added to a vehicle in order to equip same according to the invention.

The spring 1 and the lever 5 may be arranged in planes extending in the same direction, as hitherto described, or in planes extending in different directions. Fig. 3 shows a modification in which said planes are transverse. The levers 5' carry shackles 12 between the ends 13 and 13ª of which is attached a main leaf 14. On both sides of said leaf are placed secondary leaves 15, so as to form a so-called "complete" spring. The central part of the spring 16 thus formed is rigidly secured, for example by means of the collar 17, to the suspended part of the vehicle.

In the second main form or modification shown in Fig. 4, the suspended part of the vehicle is provided with a cross-piece 18 to which are pivoted, on both sides of the axis x—x, by means for example of so-called "Silentbloc" devices 19 and 20, supporting arms 21 and 22. At the ends 23 and 24 of said supporting arms are pivoted arms 25 and 26 which carry at their end shackles 27 and 28 respectively. To the shackles 27 and 28 are attached the ends of a leaf spring 29 forming the resilient device of the main suspension and the central part of which is fixed, by means of the clamps 30 and 31, to the cross-piece 18.

At intermediate points 32 and 33 of the arms 21 and 22 is attached the main leaf 34 of a spring 35 which forms the auxiliary suspension according to the invention and the central part of which is fixed to the suspended part of the vehicle, which is represented by the cross-piece 18, by means of the clamps 30 and 31 and of the spacing block 36.

In the modification according to Fig. 5, the supporting arms, instead of being pivoted on the cross-piece 18, are rigidly secured to said cross-piece, but are formed by flexible blades 37, which replace the pivotal mounting of the arms 25, 26 in Figure 4 while at the same time serving as supports for the horizontal arms shown in broken lines to which the shackles 27, 28 and the ends 34, 34 of the spring may be secured. The levers 25', 25' are pivoted to the lower ends of members 37, 37 at 23', 23', while the ends 34, 34 of the spring 35 of Fig. 4 are connected to the shorter ends 32', 32' of said levers. The opposite ends 34', 34' of the levers may be suitably connected to shackles 27, 28 as shown in Fig. 4.

In the modification shown in Figs. 6 and 7, an arm 38 is pivoted at a point 39 secured to the wheel train and is extended by two plates 40 and 41 which leave a space 42 between them. The end of the plates 40 and 41 is mounted, through the intermediary of shackles 43 and 44, on the suspended part of the vehicle. A spring 45 is contained in the space 42; the end of its main leaf 46 is attached to a shackle 47 mounted on the suspended part of the vehicle at 48. The leaves of the spring 45, at the end of the shackle 47, are secured to an intermediate point of the lever 38, for example by forcing in a gusset 49.

The modification according to Figs. 8 and 9 only distinguishes from the previous form or modification by the inversion of the positions of the shackle 47 and of the gusset 49.

A simple means for varying the intensity of the action of the auxiliary suspension according to the magnitude and the direction of the deformation of the main suspension consists, according to the invention, in eliminating a number or even all of the leaves of the spring that are located on a predetermined side of the main leaf.

In Fig. 10 there has, for example, been shown, as a modification of Fig. 1, a method of construction of the auxiliary suspension in which the spring 50 is only provided with leaves below the main leaf 51. Under these conditions, the auxiliary suspension offers a particularly efficacious resilient resistance to a deformation of the main suspension corresponding to a downward movement of the point 3ª relatively to the half-collar 8, whereas on the contrary it only acts very little for an oppositely directed deformation of the main suspension.

In Fig. 11, which shows a different modification, the spring 52 is provided with a larger number of leaves below the main leaf 53 than above said leaf. Furthermore, the end 3ª of the shackle 3 is pivoted on the arm 54 of the shock-absorber 55 provided on the vehicle and which thus performs the function of lever 5. The wheel center corresponds to that of bolt 55.

In the modification of Fig. 12, which shows a diagrammatical transverse section of a vehicle, the suspended part of same is represented by a shell or cradle 56 connected to the unsuspended part, including the wheels 57 and 58, by means of torsion bars 59 and 60 which form the main suspension. Said torsion bars are connected to the wheels 57 and 58 by means of pivoting arms 61 and 62. The connection of the wheels 57 and 58 to the shell 56 is completed by levers 63 and 64 which are pivoted at their ends, respectively to the suspended part and to the unsuspended part of the vehicle. According to the invention, at least one of the wheel trains of the vehicle, for example the front wheel train, is equipped with a leaf spring 65 which is fixed at its central part on the shell 56 by means of clamps 66 and the ends 67 and 68 of the main leaf 69 of which are mounted, by means of preferably adjustable shackles 70 and 71, at intermediate points 72 and 73 of the levers 63 and 64.

In the modification according to Fig. 13, the arrangement is similar; however, the main suspension is formed by a leaf spring 74.

In the modification of Fig. 14, which is similar, the front cross-piece 75 which is secured to the chassis forming the suspended part of the vehicle is connected to the wheels 76 and 77 by means of lower arms 78 and 79 and of upper arms 80 and 81; helical springs 82 and 83, with shock-absorbers, are interposed between the cross-piece 75 and the lower arms 78 and 79 and form the main suspension. The auxiliary suspension according to the invention is formed by a leaf spring 84 which is fixed at its central part on the cross-piece 75 and the ends 85 and 86 of the main leaf 87 of which are mounted, with the interposition of shackles 88 and 89 which are preferably adjustable, at intermediate points of the arms 80 and 81.

In the modification of Fig. 15, the main suspension comprises a transverse leaf spring 90 interposed between the suspended part 91 of the vehicle and the wheel 92. A triangular member 93 completes the connection between the wheel 92 and the suspended part 91. At an intermediate point 94 of the member 93 is mounted, with the interposition of a shackle 95, the end of the main leaf 96 of a half leaf-spring 97 which is fixed on the other hand by means of the collar 98 in the suspended part of the vehicle, said spring 97 forming the auxiliary suspension.

I claim:

1. In a suspension system for a vehicle having a frame, a main suspension device including a generally horizontal resilient means secured intermediately to a portion of said frame, a pair of generally horizontal lever means spaced apart transversely of the vehicle, the ends of said resilient means being pivotally connected to said lever means, an auxiliary suspension device having its effects added to those of said main suspension device, including a second resilient means comprising a multiple-leaf spring secured to a portion of said frame above the first mentioned portion, and which acts when the main suspension device is deformed from the position of equilibrium but has a reduced deformation with respect to that of the main suspension, the ends of said second resilient means being respectively connected to said generally horizontal lever means at points remote from the connections of said first mentioned resilient means therewith.

2. In a suspension system for a vehicle having a frame, a main suspension device including a generally horizontal resilient means secured intermediately to a portion of said frame, a generally horizontal lever pivotally connected to the suspended part of the frame of the vehicle, an end of said resilient means being pivotally connected to said lever, an auxiliary suspension device comprising a second resilient means including a multiple-leaf spring disposed substantially normal to the longitudinal axis of said vehicle and attached to another portion of said frame on a different level than said first mentioned portion between the suspended part of said frame and an intermediate point upon said lever, this lever being fulcrumed on the vehicle in a vertical plane different from the planes of attachment of said resilient means to said vehicle, and the attachment of said resilient means to said vehicle frame being substantially directly one above the other.

3. In a suspension system for a vehicle having a frame, a main suspension device including a generally horizontal resilient means secured intermediately to a portion of said frame, a pair of generally horizontal levers pivotally connected to the suspended part of the frame of the vehicle, the ends of said resilient means being pivotally connected to said levers, an auxiliary suspension device comprising a second resilient means including a multiple-leaf spring disposed substantially normal to the longitudinal axis of said vehicle and attached to another portion of said frame on a different level than said first mentioned portion, said second resilient means connecting the suspended part of said frame and intermediate points upon said levers, the levers being fulcrumed on the vehicle in spaced vertical planes other than the planes of attachment of said resilient means to said vehicle, and the attachment of said resilient means to said vehicle frame being substantially directly one above the other.

4. An automobile vehicle suspension, which comprises a transverse spring fixed at its centre to a predetermined portion of the suspended part of the vehicle and at its ends to unsuspended points, levers spaced apart and interposed between said points and the suspended part of the vehicle, a leaf spring fixed at its centre to another portion of the suspended part at a different level than that of the first mentioned portion and the ends of the main leaf of which are attached to intermediate points of said levers, the attachment of one of said springs being substantially directly above the attachment of the other to said vehicle.

JEAN VANCOPPENOLLE.